Dec. 6, 1927.

F. J. BENSON 1,651,801

METHOD OF MAKING TIRE CASING REPAIR PATCHES

Filed March 7, 1927

INVENTOR.
Fred J. Benson
BY
Edward C. Taylor
ATTORNEY.

Patented Dec. 6, 1927.

1,651,801

UNITED STATES PATENT OFFICE.

FRED J. BENSON, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING TIRE-CASING-REPAIR PATCHES.

Application filed March 7, 1927. Serial No. 173,381.

My invention relates to the manufacture of repair patches for use inside of tire casings. These patches, which are used for emergency repair to tires while on the road, are prepared in the shape of the interior of the tire casing, and are provided with an adhesive outer surface which enables them to stick to the inside of the casing without the application of any cement at the time that the repair is being made. In order to protect this adhesive layer it is customarily covered with a sheet of holland or shade cloth which has an air-tight surface. In the commercial manufacture of patches of this character much difficulty has been experienced in the smooth application of the holland to the curved surface of the patch. The holland has wrinkled to such an extent that the appearance of the patch was greatly marred. According to my invention patches of this character can be covered wth holland without wrinkling.

My invention will now be described in connection with the accompanying drawings, in which Fig. 1 is a view of patch prior to the application of the holland layer;

Figure 1:
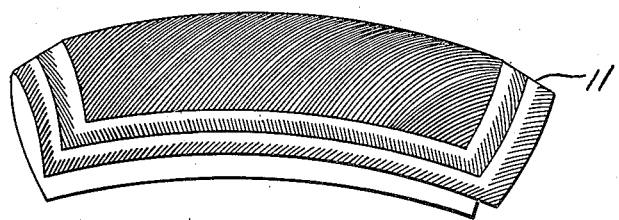

The patch shown generally at 10 in the drawings has beveled ends 11, formed by stepping off the various plies of fabric or by skiving the patch after it has been built, and has an outer adhesive surface of raw rubber or cement. The shape of this patch is so designed as to fit the interior of the tire casing in which it is to be used. It will be noticed that the patch is curved in two directions, making it impossible to apply a layer of fabric to it without distortion or considerable stretching of the fabric. In applying the layer of holland 13 to the surface of the patch, I moisten one surface of the holland in order to relieve the stiffness of the sizing with which the cloth is impregnated. Preferably, this moistening is done with a solution of size in order to avoid impairment of the property of the holland in excluding air from the rubber coating of the patch. Normally, holland is non-extensible on account of the size but, by moistening one side of the fabric, this size is softened to such an extent that the holland can be distorted. I support the holland, with the moistened side down, upon a bag or other yieldable surface 14. As shown, this bag is made to lie within a holder 15 and is provided with an inflating valve 16 so that it may be blown up to the required degree. With a block 17, provided with a handle 18 and shaped to fit the patch, I now press the patch against the unmoistened surface of the holland commencing with the middle of the patch and gradually forcing it into the yielding surface until the holland has been completely applied. This shapes the holland smoothly to the patch and any excess at the edges can now be trimmed off, making a product of greatly improved appearance.

Figure 2:
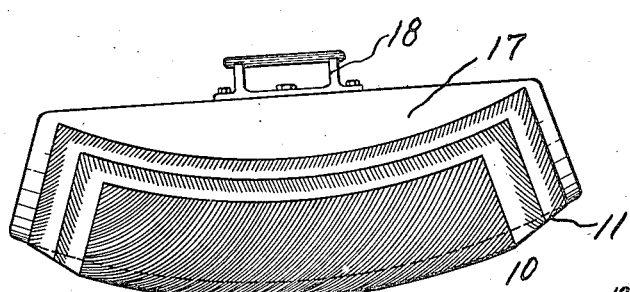
Fig. 2 is a view showing the application of the holland in accordance with my invention.
Figure 3:
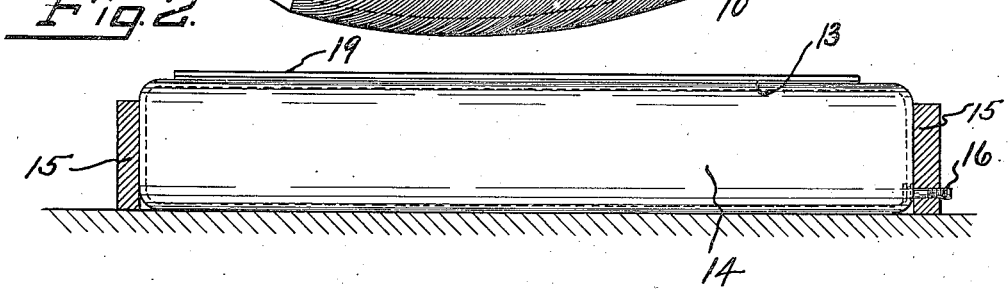
Fig. 3 is a detail of the patch after the holland has been applied.
Figure 4:
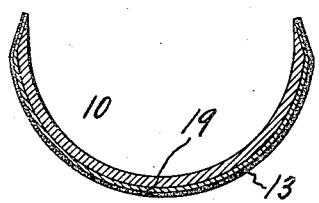
Fig. 4 is a transverse section through the patch shown in Fig. 3.

The adhesive substance with which the patch is covered may be applied in the form of cement, which is allowed to dry before the application of the holland; or in the form of uncured sheet rubber. If the latter mode is employed, a conveneient way is to calender the rubber sheet directly upon the holland as indicated at 19 in Fig. 2. Of course, the side of the holland not in contact with the rubber is the one which is moistened.

Having thus described my invention, I claim:

1. A method of making tire-shaped casing patches which comprises forming a patch of the desired shape, calendering a sheet of uncured rubber onto a sheet of holland, moistening the sheet of holland on one side, supporting the holland on a yielding surface with its moistened side down, and pressing the patch against the unmoistened side of the holland and into said yielding surface while maintaining its shape, whereby the holland and rubber sheets are stretched and stuck smoothly and uniformly upon the surface of the patch.

2. A method of making tire-shaped casing patches which comprises forming a patch of the desired shape, moistening one side of a sheet of holland, and pressing the holland and patch together with a gradual and progressive pressure starting at the center of the patch and working towards the edges.

FRED J. BENSON.